(No Model.)

R. WALSH.
STUFFING BOX PACKING.

No. 454,551. Patented June 23, 1891.

WITNESSES:

INVENTOR

UNITED STATES PATENT OFFICE.

RICHARD WALSH, OF PHILADELPHIA, PENNSYLVANIA.

STUFFING-BOX PACKING.

SPECIFICATION forming part of Letters Patent No. 454,551, dated June 23, 1891.

Application filed October 24, 1890. Serial No. 369,178. (No model.)

*To all whom it may concern:*

Be it known that I, RICHARD WALSH, a citizen of the United States, residing at Philadelphia, in the county of Philadelphia and State of Pennsylvania, have invented certain new and useful Improvements in Stuffing-Box Packings; and I do hereby declare the following to be a sufficiently full, clear, and exact description thereof as to enable others skilled in the art to make and use the said invention.

This invention relates to stuffing-box packings for piston-rods, plungers of pumps, and like engineering constructions, and has for its object the greater durability of such packing and facility of introduction and removal without waste of the packing material.

To this end this packing consists of alternate washers or rings of ductile metal with interposed rings of non-adhesive material, the metallic rings being of such cross-section as first compress each other near the center or portion in contact with the rod.

The mode of making and using these packings is hereinafter fully described, and is illustrated in the accompanying drawings, in which—

Figure 1:
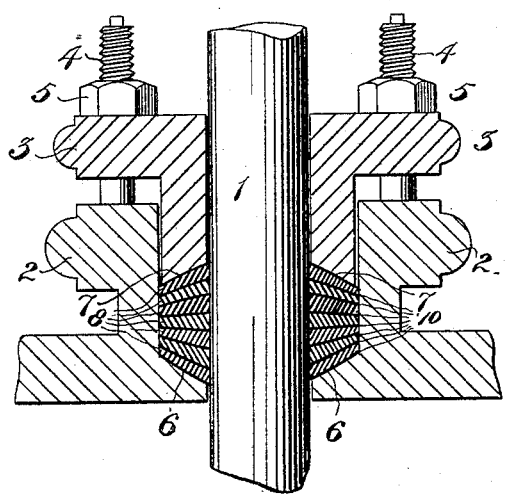
Figure 2:
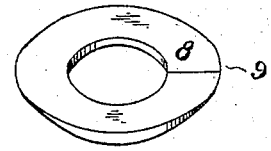
Figure 3:
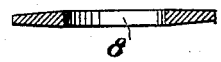
Figure 4:
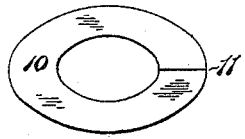

Figure 1 shows a central vertical section of a stuffing-box containing a packing embodying this invention with a portion of a piston rod therein. Fig. 2 shows a perspective view of one of the metallic washers forming the packing; Fig. 3, a transverse section thereof; Fig. 4, a perspective view of the non-adhesive or separating washer, and Fig. 5 shows one of the metallic washers as bent open for the purpose of applying it to the rod.

Referring to the drawings, 1 represents the piston-rod; 2, the stuffing-box body; 3, the gland thereof; 4, screw-studs fitted each with a nut 5 to draw the gland 3 into the stuffing-box 2. The bottom 6 of the stuffing-box 2 and also the lower end 7 of the gland 3 are made concave.

8 8 8 are rings or washers of ductile metal, lead or tin or soft alloys of tin and lead answering the purpose. One of these rings is shown in section in Fig. 3, where it will be seen that they are thicker at the center than at the edges. The rings 8 are cut across at one point, as shown at 9 in Fig. 2, so that they can be bent in the form shown in Fig. 5 for the purpose of placing them around the rod 1. The flexible washers 10 cut, as shown at 11 in Fig. 4, so as to bend in the same manner as the washer 8 to be placed around the rod, are formed of the same external diameter as the inside of the stuffing-box 2 and of the same internal diameter as the rod 1. These washers 10 should be made of material incapable of adhering or uniting with the metallic washers 8. For this purpose paper, cloth, asbestus, films, or mica may be used; but paper is preferable. The function of these washers 10 is to prevent union and adhesion of the several washers 8 when pressed together, and thus facilitate their removal without injury from the stuffing-box 2.

Figure 5:
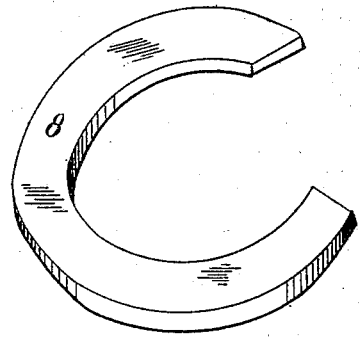

To apply this packing to use, the gland 3 is removed from the stuffing-box 2, one of the washers 8 bent as shown in Fig. 5, and pressed down into flat form in the bottom of the stuffing-box 2. One of the washers 10 is then applied in like manner, next another washer 8, and so on alternately, with the cuts 9 breaking joints until the stuffing-box 2 is nearly filled. The gland 3 is then put in position and drawn down upon the packing by means of the nuts 5 on the screws 4. The rings 8 bend downward and upward into the cavities 6 and 7, and as the compression proceeds are forced inwardly against the rod 1, making close contact therewith, the thicker centers of the rings 8 inclining them to press toward the rod in the same manner as a pile of wedges placed with their butts in juxtaposition from a bow or arch.

When it is desired to remove the packing, the gland 3 is removed and they are readily raised by means of a pointed hook, and can be replaced and without waste.

Having described this invention, what I claim is—

The stuffing-box packing described and shown, consisting of washers of ductile metal centrally thicker than the edges and cut open, as described, combined with alternate washers of non-adhesive fibrous material, constructed and arranged substantially as set forth.

RICHARD WALSH.

Witnesses:
W. D. MAHN,
J. DANIEL EBY.